United States Patent [19]

Litzenberger et al.

[11] Patent Number: 5,617,422
[45] Date of Patent: Apr. 1, 1997

[54] HIGH SPEED INTERFACE IN A TELECOMMUNICATIONS NETWORK

[75] Inventors: Paul D. Litzenberger, Wylie, Tex.; Louis G. Gottlieb, Colorado Springs, Colo.

[73] Assignee: MCI Communications Corp., Washington, D.C.

[21] Appl. No.: 513,593

[22] Filed: Aug. 10, 1995

[51] Int. Cl.⁶ .............................. H04J 3/12; H04L 12/46
[52] U.S. Cl. .......................... 370/401; 370/412; 370/906
[58] Field of Search ............................ 370/85.13, 85.12, 370/85.14, 85.6, 85.9, 85.2, 85.1, 58.2, 68.1

[56] References Cited

U.S. PATENT DOCUMENTS

| | | | |
|---|---|---|---|
| 4,975,906 | 12/1990 | Takiyasu et al. | 370/85.13 |
| 5,018,133 | 5/1991 | Tsukakoshi et al. | 370/16 |
| 5,070,498 | 12/1991 | Kakuma et al. | 370/60 |
| 5,079,765 | 1/1992 | Nakamura | 370/85.13 |
| 5,172,372 | 12/1992 | Konishi | 370/82.13 |
| 5,251,213 | 10/1993 | Videlock et al. | 370/85.12 |
| 5,291,492 | 3/1994 | Andrews et al. | 370/110.1 |
| 5,317,568 | 5/1994 | Bixby et al. | 370/85.6 |
| 5,331,634 | 7/1994 | Fischer | 370/85.13 |
| 5,335,268 | 8/1994 | Kelly, Jr. et al. | 379/112 |
| 5,341,374 | 8/1994 | Lewen et al. | 370/85.4 |
| 5,365,523 | 11/1994 | Derby et al. | 370/85.2 |
| 5,379,291 | 1/1995 | Herzberg et al. | 370/85.5 |
| 5,392,033 | 2/1995 | Oman et al. | 340/825.5 |
| 5,425,029 | 6/1995 | Hluchyj et al. | 370/94.1 |
| 5,450,411 | 9/1995 | Heil | 370/94.2 |
| 5,473,608 | 12/1995 | Gagne et al. | 370/85.13 |
| 5,490,252 | 2/1996 | Macera et al. | 395/200.01 |

*Primary Examiner*—Hassan Kizou
*Assistant Examiner*—Kwang Bin Yao

[57] ABSTRACT

A telecommunications system comprises two groups of intelligent platforms in a common carrier's network. Each intelligent platform includes an application or a service for processing a call related transaction. The intelligent platforms in each group are arranged in the Local Area Network configuration, such as a Fiber Distributed Data Interface, to transfer the call related transaction to each other for further processing. Each group of the intelligent platforms comprises a node on the Wide Area Network, such as an Asynchronous Transfer Mode (ATM), which provides the high speed support for transferring the call related transaction among the intelligent platforms of each group. The combination of these two transport mechanisms will provide a high speed interface and sufficient bandwidth for the projected increase in traffic volume.

17 Claims, 7 Drawing Sheets

FIG. 1

| Priority | Application |
|---|---|
| High | DB Transaction |
| High | DCR Transaction |

FIG. 2A

| Priority | Application | Node |
|---|---|---|
| Low | Billing Information | Billing 110 |
| Low | Critical Alarms and Logs | LSE 114/ OAM&P 108 |
| Low | Critical Maintenance | OAM&P 108 |
| Low | Major Alarms and Logs | LSE 114/ OAM&P 108 |
| Low | Traffic Statistics | Traffic 112 |
| Low | Normal Maintenance and Provisioning | OAM&P 108 |
| Low | Minor Alarms and Logs | LSE 114/ OAM&P 108 |
| Low | Other Applications and Information | AP 106 |

HIGH SPEED INTERFACE IN A TELECOMMUNICATIONS NETWORK

FIELD OF THE INVENTION

This invention relates to a telecommunications network and in particular to a telecommunications system using local area network (LAN) and wide area network (WAN) configurations to provide total interconnectivity among nodes using a high speed interface.

BACKGROUND OF THE INVENTION

As migration toward more intelligent services occurs, the communications requirements between the long distance switching office (switch) and an intelligent platform (IP), such as a remote database, will exceed the capacity of data links. Currently, the connectivity between the switch and the remote database is available via X.25 communications protocol operating at 19.2 Kbits per second, as described in U.S. Pat. Nos. 5,095,505 and 5,335,268 which are of common assignee with the present invention. As more and more calls require special processing by the intelligent platform, current X.25 connectivity will be inadequate to support the volume of transactions. The capacity requirements will be impacted by the following factors:

1. Increase in service complexity will require more data transactions per call between the switch and the intelligent platform. Through the next five years, it is anticipated that the calls processed by the switch will increasingly require information that is non-resident in its database to complete the call accurately and timely. This information will be needed not only for initial call routing, but also multiple times during call progression, after call completion, during call tear down, etc.

2. Each message will grow in size for a transaction between the switch and the intelligent platform, because more complex services require more complex information processing. In order to ensure that each network element involved in a call has sufficient information to process the call effectively, greater volumes of information will be shipped across the network that have real-time critical implications. The processors involved in the call setup cannot wait for information in multiple packet transactions to arrive and be reassembled prior to processing and responding. Within the next five years, it is expected that the size of the transaction will be at or in excess of 256 bytes for a typical transaction.

3. Expansion of the existing services will trigger more data transactions between the switch and the intelligent platform. The telephone traffic requiring interaction with a database to complete call processing is considered intelligent traffic. The telephone traffic not requiring the database interaction is considered standard traffic. Due to the increasing complexity of the calls and services currently offered or proposed in the future, it is becoming increasingly difficult to determine the service being requested when a call arrives at the switch. Many calls that previously required no interaction with the intelligent platform will require determination of service that is being requested.

4. Introduction of new services will require additional data transactions. Most, if not all, new service offerings require information, routing, or verification that is not resident in the switch to complete call processing. Almost all new services will therefore require interaction with the database.

5. Operations, Administration, Maintenance, and Provisioning considerations will require more capacity to provide remote control of the switch. Many back-office network systems can be enveloped into the heading of Operations, Administration, Maintenance, and Provisioning (OAM&P). Database control of Automatic Number Identification (ANI) and routing information at a network level must be maintained and coordinated. Remote maintenance activities as well as circuit provisioning must be handled remotely. Present methods are nearing the end of their useful life cycle.

A need therefore exists for a fast, low layer transport mechanism to support the call control applications between the switch and the intelligent platform, as well as among the intelligent platforms.

SUMMARY OF THE INVENTION

It is therefore an object of the invention to provide a high speed interface for transferring call related transactions between the switch and the remotely located intelligent platform.

It is another object of the invention to provide a high speed interface for transferring call related transactions among the remotely located intelligent platforms.

It is still another object of the invention to provide a high speed interface for transferring call related transactions among the intelligent platforms, as well as the switch, using LAN and WAN configurations.

These and other objects, features and advantages are accomplished by the disclosed invention.

In one embodiment of the invention, a telephony network system of a common carrier comprises a first group of intelligent platforms for processing call related transactions. The intelligent platforms are arranged in a local area network configuration for providing communication among each other.

In accordance with this embodiment, the disclosed system includes a second group of intelligent platforms, similar to the first group, also for processing call related transactions. The second group of intelligent platforms are interconnected via another local area network, similar to the first one, for providing communication among each other.

Further in accordance with the invention, a wide area network connects the intelligent platforms of the first local area network and the intelligent platforms of the second local area network for providing a high speed interface for communication among them.

In another embodiment of the invention, a telephony network system of a common carrier includes two groups of intelligent platforms. Each platform can process a call related transaction. The intelligent platforms in each group are arranged in a local area network configuration for providing communication among the intelligent platforms within each group.

In accordance with this embodiment of the disclosed invention, a remotely located switch is provided for routing the telephone call from a calling station to a called station.

Further in accordance with this embodiment, a wide area network connects the intelligent platforms of the first local area network, the intelligent platforms of the second local area network, and the switch for providing a high speed interface for communication among them.

BRIEF DESCRIPTION OF THE DRAWINGS

The above-mentioned advantages of the present invention will be more clearly understood when considered in conjunction with the accompanying drawings, in which.

In all Figures, like reference numerals represent same or identical components of the present invention.

DESCRIPTION OF THE PREFERRED EMBODIMENTS

Figure 1:
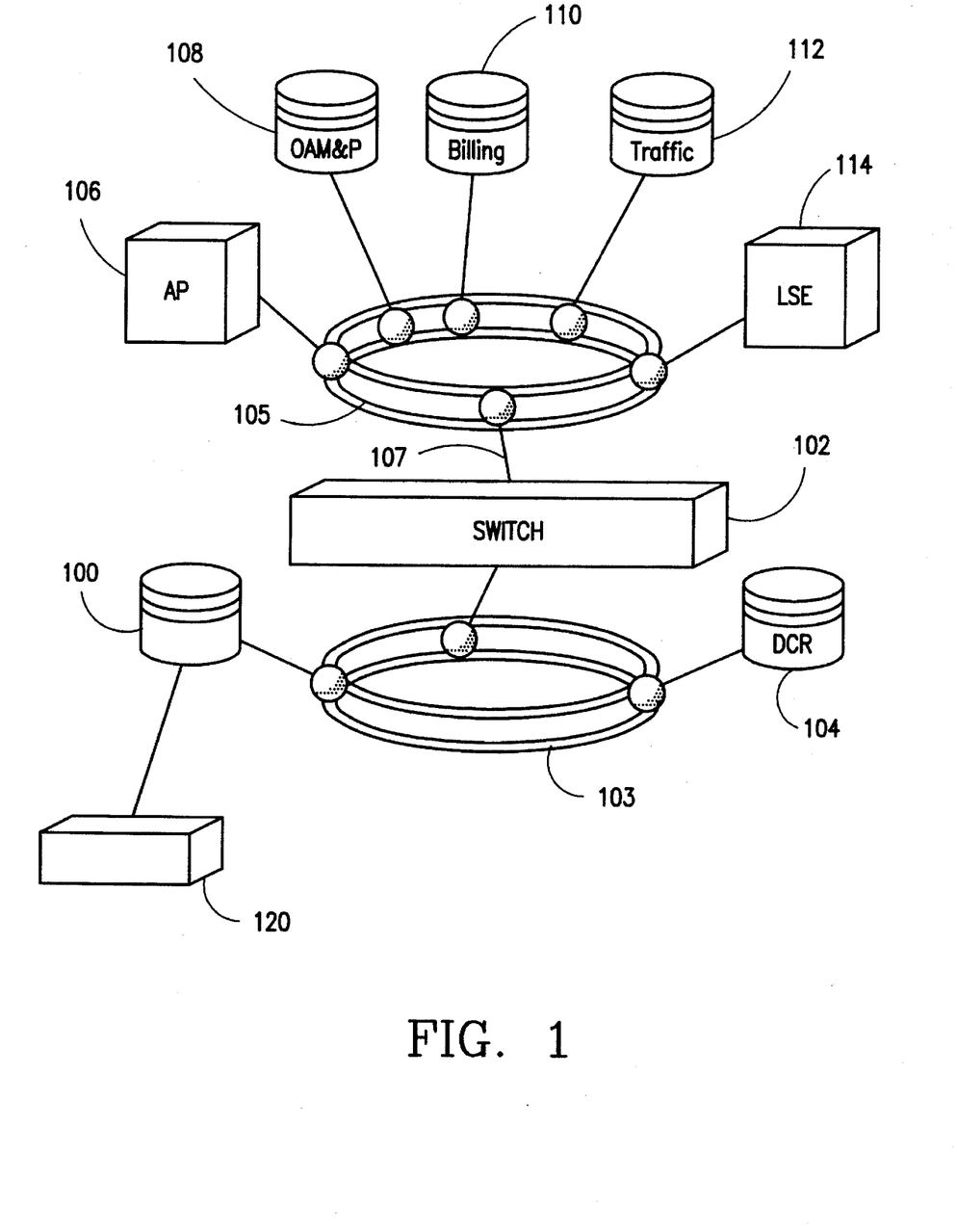
FIG. 1 illustrates one embodiment of a telephony network system using a high speed interface for communication between a switch and the intelligent platforms arranged in a LAN/WAN configuration.

FIG. 1 shows a high level view of the disclosed invention that provides an integrated fabric for interfacing between network nodes both for call processing critical information as well as statistical and billing information. It represents a common, highly available, multi-megabit interface. This interface supports bi-directional data transfer between service-oriented network nodes and multiple application layer protocols through a common transport layer protocol. In addition, this interface supports small-packet, dialog-based communication, and, at the same time, bulk data transfer with packet sizes of variable length.

The applications depicted in FIG. 1 are described below. Each node represents an intelligent platform comprising an application or service that a common carrier desires to support through the high speed interface.

FIG. 1 shows a database 100 and a Dynamically Controlled Routing (DCR) platform 104 connected via a Local Area Network (LAN) 103 which is typically a short distance data communications network for linking devices under some form of control. One example of a LAN is a fiber distributed data interface (FDDI) which uses token ring topology. In the token ring topology, a data frame, i.e., token, is successively passed from one network device to another. The network device can transmit data only when it holds the token but can use the entire bandwidth of the communications media.

The database 100 provides the resource for information such as the number translation, routing address, card authorization, etc. Each transaction sent by a switch 102 receives either a positive response (routing information), or a negative response (failure) from the database 100.

The DCR 104 includes an application requiring exchange of information with the switch 102 on a cyclical basis. The overall objective of the DCR 104 is to provide congestion reroutes for improving overall network capacity utilization. This service may be located on another platform which is remotely located from the database 100.

Remotely located from the database 100 and the DCR 104 is the switch 102, which establishes the communication connection between the telephone stations and its ingress and egress communication lines. The technology of completing the call from the calling station to the called station by selecting an available communication line is well known in the art and will not be described in detail.

FIG. 1 shows a multitude of telecommunication applications and services which are remotely located from the switch 102, the database 100, and the DCR 104. The adjunct processor (AP) 106 in this context refers to any general purpose computer that could be programmed to use the common protocol of the high speed interface and have information routed to it from any other node on the high speed interface. The adjunct processor 106 on this interface might have, for example, fraud management and detection software application. This type of application would require access—on a near real-time basis through the disclosed high speed interface—to one or all switches, in order to halt or prevent fraudulent calls in the network.

Another application of the adjunct processor 106 is a software reservoir for the switch 102 using the adjunct processor 106 to provide a central point for downloading new software applications to the switch 102 from an external source. As will be explained below, using the disclosed high speed interface system, other switches in addition to the switch 102 would have access to the new software applications residing at the adjunct processor 106. The switch software reservoir would typically require transfer of large quantities of data in very large packets. During the software upgrade, the data transfer occurs without any real-time impact to the traffic processing capability of the switch 102. The amount of the transferred data depends on the size of the software load and its modularity.

In addition to the above functions, the adjunct processor 106 may store and forward billing information generated by the switches. Along with the store and forward activity, it is also responsible for billing record replication. To accomplish this, every billing record produced by the switch 102 is polled against a set of criteria to determine if replication is necessary. The use of the high speed interface provides broadcast capabilities, wherein the network elements requiring information from the billing stream can access that information directly and in near real-time.

Many back-office systems can be included under the heading of Operations, Administration, Maintenance, and Provisioning (OAM&P) 108. According to one embodiment of the present invention, the OAM&P 108 represents those network functions that are required to control the switch 102 and other network elements on a day-to-day basis. These services are provided to each switch based upon individual need and maintain consistency from a network level viewpoint. To accomplish all aspects of this operation, all of the support functions must have access to all the switches in as near real-time as possible. The OAM&P 108 functions, although not critical to the actual processing of a call, are nevertheless critical to the control of a large network. Although the transferred packets will not be significant from a capacity perspective, reducing delay in response time from remotely initiated commands must be considered a critical function of the network.

The billing system platform 110 depicted in FIG. 1 represents a common point into the back-office billing systems. Using the high speed interface in accordance with the present invention, various network elements could create a billing record based upon its participation in a network call. That information could then be sent, using the high speed interface, to the common billing point represented by the billing system platform 110. This would provide a more real-time accounting of the billing transactions that occur network-wide.

Continuing with the description of FIG. 1, another node is the traffic statistics platform 112. With the use of the high speed interface, traffic statistics, whether accumulated from event pegs and usage timers or from billing analysis, could be rapidly distributed by the switch 102 to the traffic statistics platform 112. After analysis and collation, the resultant information could be distributed to customers, again, via the high speed interface in accordance with the present invention.

The local support element (LSE) 114 provides a focal point for back-office network management systems to send and receive information from the switch 102. This information is required for switch health and network integrity. Although this information is not critical to the individual processing of a call, it has real-time implications should network difficulties be encountered. Network management systems must receive alarm indications as soon as they are detected so that corrective actions can be initiated. The use of the high speed interface for this application reduces the latency between the detection of a network event, the reporting of that event, and the delivery of the resolution to correct that event. The net effect is to minimize the Mean Time To Restore (MTTR) of an outage of any kind within the network.

The adjunct processor 106, the Operations, Administration, Maintenance, and Provisioning platform 108, the billing system platform 110, the billing based traffic statistics platform 112, and the Local Support Element 114 are arranged in a local area network (LAN) 105 configuration to provide communication connection among each of the applications and services. Similar to the LAN 103, the LAN 105 is a fiber distributed data interface (FDDI).

Further in accordance with the invention, the switch 102, the LAN 103, and the LAN 105 are connected via a Wide Area Network (WAN) 107 which is typically a long distance data communications network for linking devices under some form of control. One example of a WAN is Asynchronous Transfer Mode (ATM) which is a high speed packet switching technique. Thus, the switch 102, the first group of intelligent platforms on the LAN 103 and the second group of intelligent platforms on the LAN 105 represent three nodes on the WAN 107 which can also support more than three nodes. This configuration allows the database 100, the DCR 104, the switch 102 and each of the lower priority applications and services on the LAN 105 to communicate with each other using the high speed interface of the LAN/WAN configuration.

With the use of the disclosed high speed interface, the switch 102 can route a transaction or packet to any single node on any of the LANs 103 and 105, and broadcast a transaction or packet to various nodes simultaneously. Furthermore, the switch 102 can access the node which is attached either directly or indirectly, such as a node 120, to the LAN 103 or 105.

Message prioritization is another feature of the disclosed invention. Packets on the high speed interface system must be prioritized to eliminate a conflict due to data congestion. The preferred priority of message transfer includes categorization of the applications based on their relationship to call processing. Typically, messages which are critical to call processing will not reside on the same physical interface, i.e., the LAN 103 or 105, as messages which are not critical to call processing. While this system requires two separate LANs, each interface would be identical in all aspects of its operation.

Figure 2A:
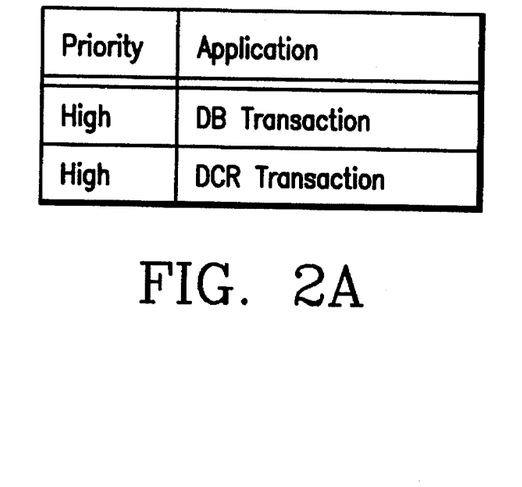
FIG. 2A shows a table of high priority applications connected in a first local area network of a common carrier.

In a message prioritization scheme shown in FIG. 2A, two applications are considered critical to call processing: the database 100 transaction processing and the DCR-related messages of the platform 104. The database 100 transactions are critical to call processing because they provide routing information during the call setup time. The DCR-related messages of the platform 104 are critical in determining traffic congestion, i.e., availability of trunks, within the common carrier network. The DCR 104 suggests routing information based upon the network view of available trunk facilities and the real-time availability of the switches. These two critical applications residing on the database 100 and the DCR 104 are remotely located on the LAN 103, as shown in FIG. 1.

Figure 2B:
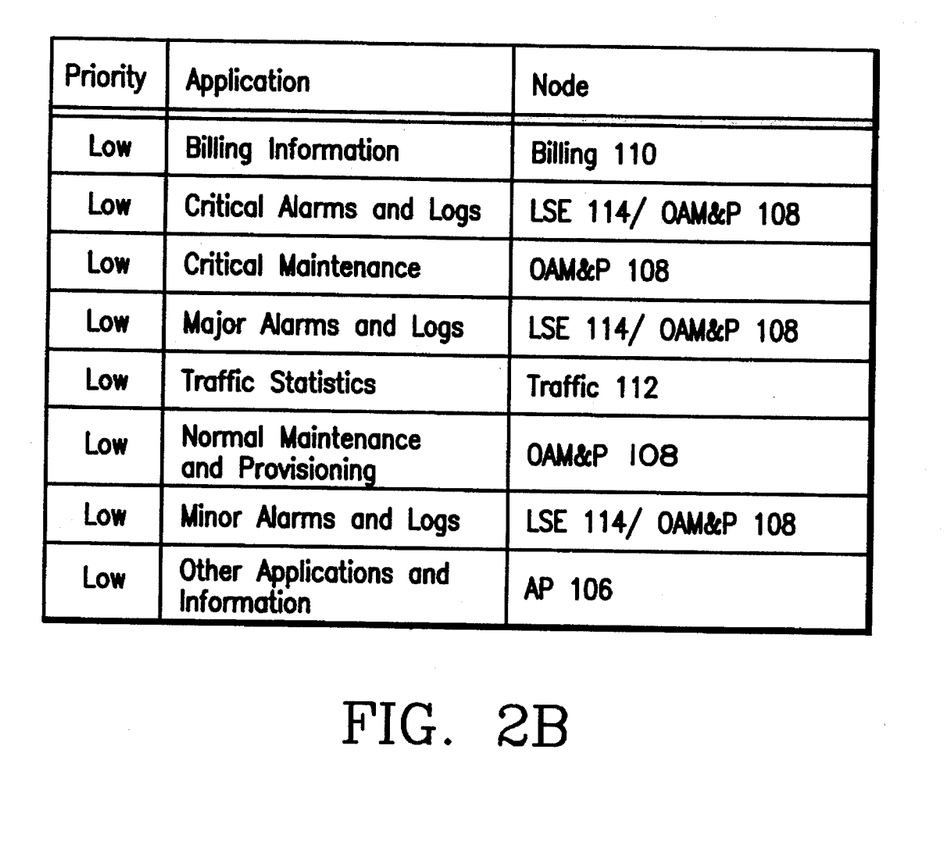
FIG. 2B shows a table of low priority applications connected in a second local area network of a common carrier.

Five other applications are considered non-critical for call processing, as shown in FIG. 2B. The prioritization of these applications is separate from, and subordinate to, call processing of the critical information. The examples of applications designated as non-critical for call processing reside on the Adjunct Processor 106, the OAM&P 108, the Billing 110, the Billing Based Traffic Statistics 112, and the Local Support Element 114. These nodes comprise another LAN 105, which is separate from the critical information-based LAN 103. Since both the Billing 110 and the Billing Based Traffic Statistics 112 derive information from the same source, there is only one priority category assigned to the billing information.

Figure 3A:
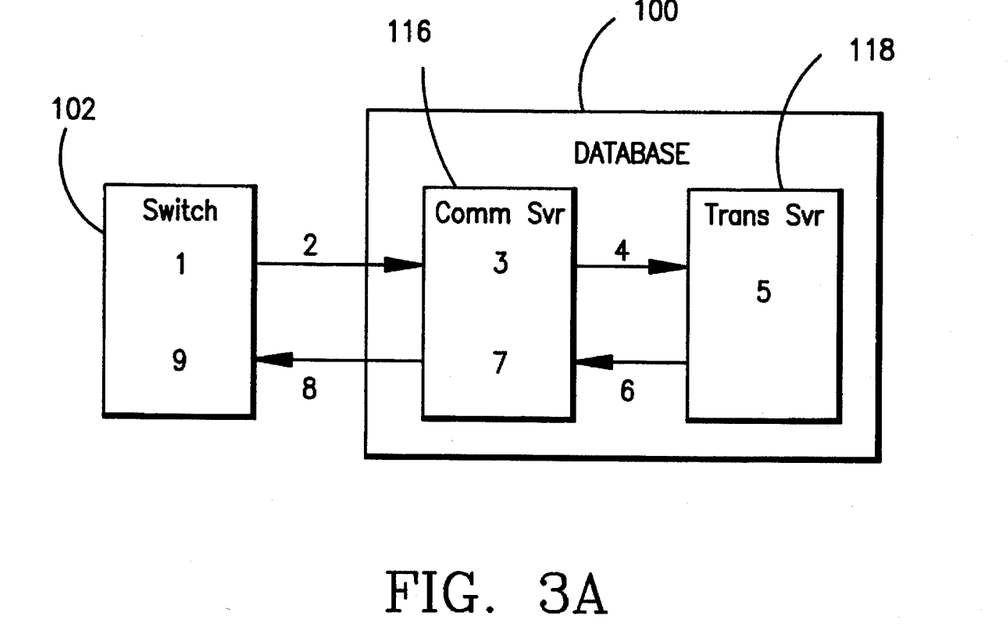
FIGS. 3A shows a block diagram for the transaction delay time in the disclosed system.
Figure 3B:
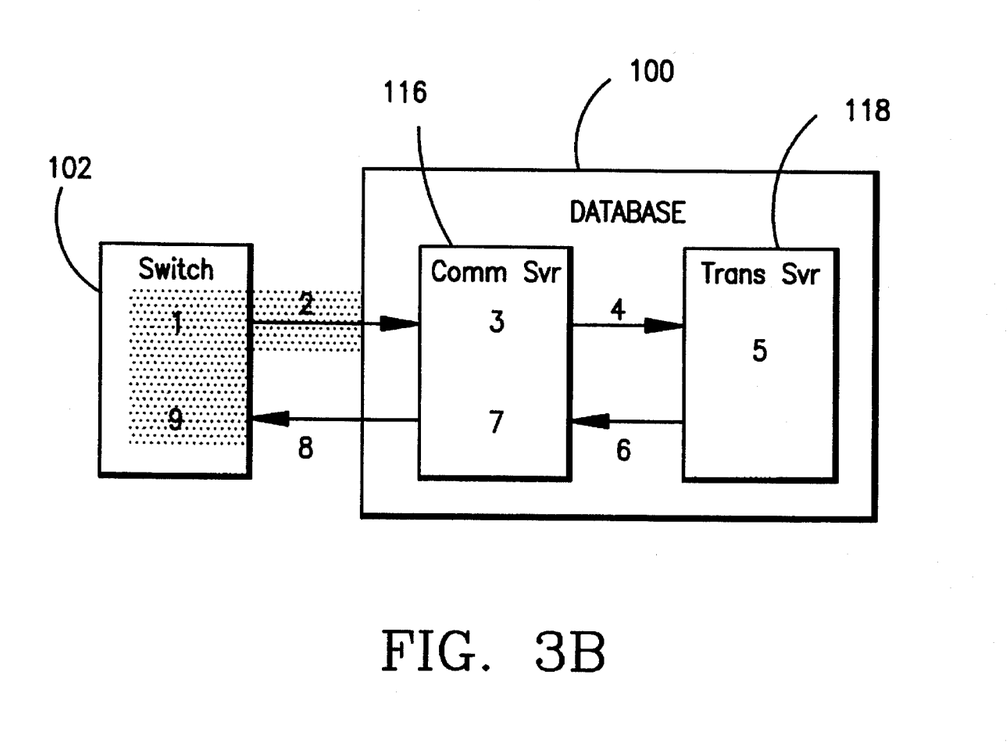
FIGS. 3B illustrates a block diagram for the transaction delay time in the switch.

Next, the system performance under the disclosed interface will be described with reference to FIGS. 3A and 3B. The system performance, in this context, is the interaction between the switch 102 and the database 100 that provides the overall performance of the two individual network elements working together. Each of the two network elements must not exceed individual delay requirements so as not to adversely affect the system performance. Additionally, each network element must meet or exceed the system throughput requirements in order to support the demand expected in the system as a whole. Conformance with these requirements results in the minimal call setup time and sufficient bandwidth to handle the increased workload. This necessitates the consideration of two performance criteria for each of the two network elements: transaction delay time measured in milliseconds (ms) per transaction, and transaction throughput measured in transactions per second (TPS).

The transaction delay time of the system denotes the time delay due to processing of a remote request from the switch 102 to the database 100. The request may be for the number translation, routing address, card verification, or other information. This time delay begins when the switch 102 recognizes the need for the remote database information and begins encoding the request. The time delay ends when the switch 102 completes the decoding of the respective response. The end-to-end transmission delay time begins when the first byte of a transaction is placed on the media at the transmitting end and ends when the last byte is taken off the media at the receiving end. The propagation delay, included within the end-to-end transmission delay time, is the time required to carry data over the media and is assumed to be, at worst case, the distance from coast to coast of the contiguous 48 United States of America. The transaction delay time of the system is the sum of all delay times outlined below and illustrated in FIG. 3A, with the numerals 1–9 below corresponding to the numerals 1–9 in FIG. 3A.

1. Recognition, encoding and queuing of the request by the switch 102.
2. End-to-end transmission of the request from the switch 102 to a communication server 116. The communication server 116 within the database 100 is a general purpose computer that receives data transactions from the switch 102 and routes them to various transaction servers based on the contents of the data transaction.
3. Processing and queuing of the request by the communication server 116.
4. End-to-end transmission of the request from the communication server 116 to a transaction server 118. The transaction server 118 within the database 100 is a general purpose computer that acts on data transactions passed from the communication server 116. The transaction server 118 may, for example, provide the number translation, routing address, card authorization, etc.
5. Processing and response queuing of the request by the transaction server 118.
6. End-to-end transmission of the request from the transaction server 118 to the communication server 116.
7. Processing and queuing of the response by the communication server 116.
8. End-to-end transmission of the response from the communication server 116 to the switch 102.
9. Queuing and decoding of the response by the switch 102.

The transaction delay time of the switch 100 is the time delay in processing a request for database information by the switch 102. As stated earlier, the request may be for translation, routing, verification, etc. This time delay begins when the switch 102 recognizes the need for the remote database information and begins encoding the request. This time delay ends when the decoding of the respective response is complete. The time delay does not include the time from the receipt of the last byte of request data, by the communication server 116, until transmission of the last byte of the corresponding response data by the communication server 116. The areas shaded in FIG. 3B illustrate portions of the time budget allotted to the switch 102.

As an example of the capabilities provided by this invention, if the switch 102 processed approximately 1.0 million call attempts in an hour, and every call required, on average, 5 transactions to the database 100 in a dialog based call processing environment, then as a result, the disclosed high speed interface provides sufficient bandwidth to handle the high transaction volume based upon the following calculation.

$$\frac{BHCA*PSR*\text{Transactions-Per-Call}}{T} = \text{Transactions-per-Second}$$

Where:
BHCA=Busy Hour Call Attempts
PSR=Peak Second Ratio
T=Time expressed in seconds Substituting into the above formula the numbers from the above example, the high speed interface would be expected to support the following number of transaction per second and the following bit volume based upon the estimated message size of either 256 or 512 octets per transaction:

$$\frac{1,000,000*1.5*5}{3600} = 2083 TPS$$

2083 TPS * 256 Octets * 8 Bits=4.27 Megabits_per_Second

2083 TPS * 512 Octets * 8 Bits=8.53 Megabits_per_Second

Estimates show that the disclosed high speed interface provides better than 10 times the throughput of the current X.25 data links. Additionally, the disclosed system provides a fault tolerant environment that virtually eliminates capacity loss due to single-point failure outages. This will give sufficient redundancy without excessive unusable bandwidth reserved for restoration purposes. Bandwidth is significantly more than projected volume needs, allowing for future growth. The fault tolerant environment bandwidth, and inherent economies of scale achieved by higher capacity channels will be a key component in driving the cost per port down.

Figure 4:
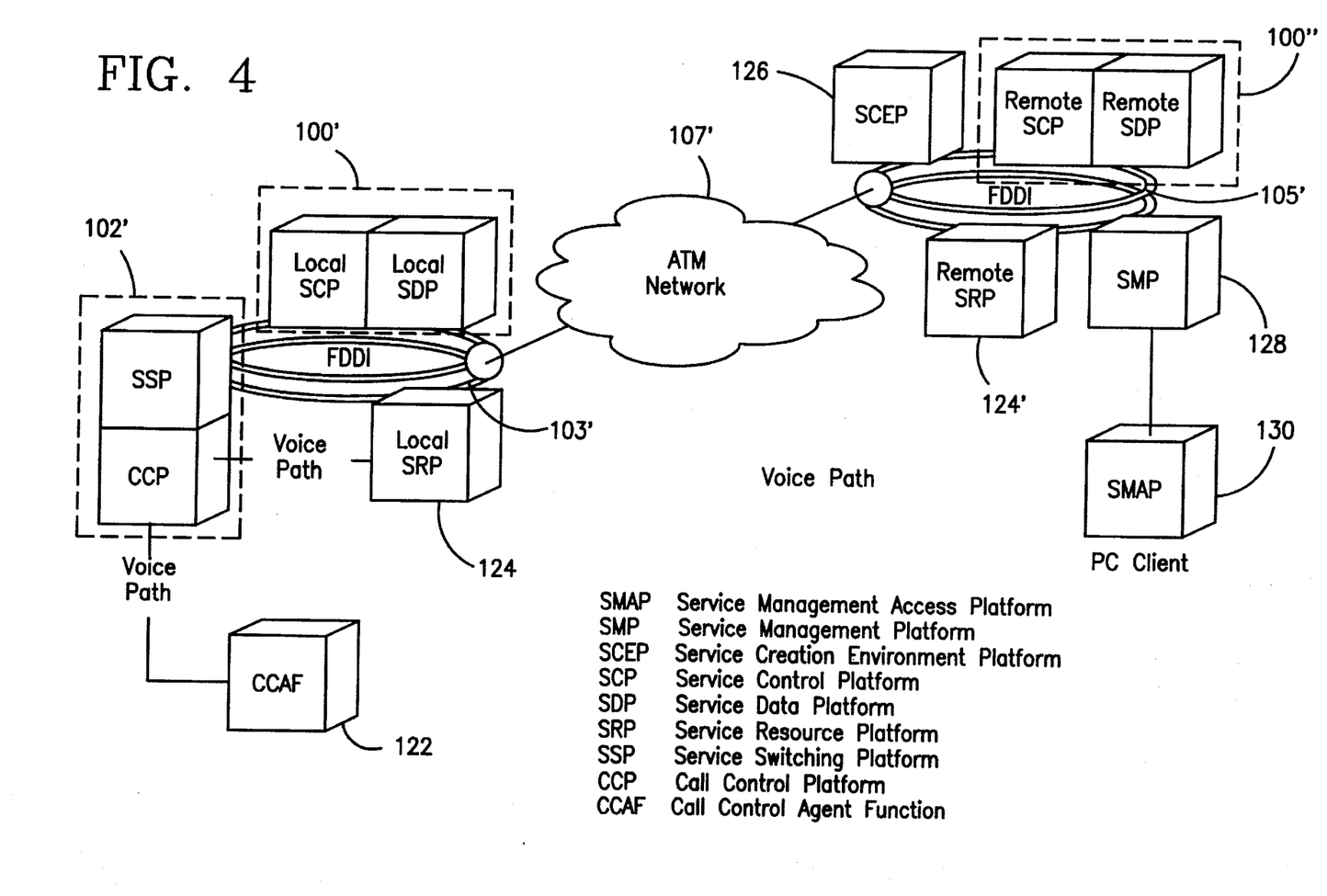
FIG. 4 illustrates another embodiment of a telephony network system using a high speed interface for communication between a local node and a remote node, which comprise intelligent platforms, arranged in a LAN/WAN configuration.

Another embodiment of the disclosed invention is shown in FIG. 4. In all Figures, identical reference numerals represent the same elements of the invention. FIG. 4 shows a Local Area Network (LAN) 103' connecting various platforms using FDDI standard. On the LAN 103' is a local Service Control Platform/Service Data Platform (SCP/SDP) 100' which is a remote database for the number translation, card authorization, routing address, etc. as previously explained. Also located on the LAN 103' is the Service Switching Platform/Call Control Platform (SSP/CCP) 102' which is a switch requesting the SCP/SDP 100' for additional information to complete the call to its destination, as also described previously.

Further according to FIG. 4, a Call Control Agent Function (CCAF) platform 122 is connected to the SSP/CCP 102' and provides the interface between the SSP/CCP 102' and the Local Exchange Carrier (LEC) or Private Branch Exchange (PBX). Connected to the SCP/SDP 100' and SSP/CCP 102' is a local Service Resource Platform (SRP) 124 communicating via the LAN 103'. If a particular resource, i.e., a voice or menu announcement, is requested to process the call, the SRP 124 manages and provides the requested resources.

In accordance with FIG. 4, a second LAN 105' connects a remote SCP/SDP 100' and a remote SRP 124 utilizing FDDI standard. Also located on the LAN 105' is a Service Creation Environment Platform (SCEP) 126 for creating and testing a new service of a common carrier. In addition, a Service Management Platform (SMP) 128 is connected, via the LAN 105', to the remote SCP/SDP 100", the remote SRP 124', and the Service Creation Environment Platform (SCEP) 126. The Service Management Platform (SMP) 128 manages the service, such as an 800 number, for the common carrier's customers. Connected to the Service Management Platform (SMP) 128 is a Service Management Access Platform (SMAP) 130 which provides an interface with the customer's equipment, typically a PC system.

The first LAN 103' and the second LAN 105' are joined together by a WAN 107', such as the Asynchronous Transfer Mode (ATM) technique, as shown in FIG. 4. Thus, the first group of intelligent platforms on the LAN 103' and the second group of intelligent platforms on the LAN 105' represent two nodes on the WAN 107' which can also support more than two groups, i.e., nodes. This arrangement allows the high speed routing of a transaction or packet to any single platform on any of the LANs 103' and 105'. Furthermore, a high speed access is provided to a platform which is indirectly attached to the LAN 103' or 105', such as the Service Management Access Platform (SMAP) 130 or the Call Control Agent Function (CCAF) platform 122.

Figure 5:
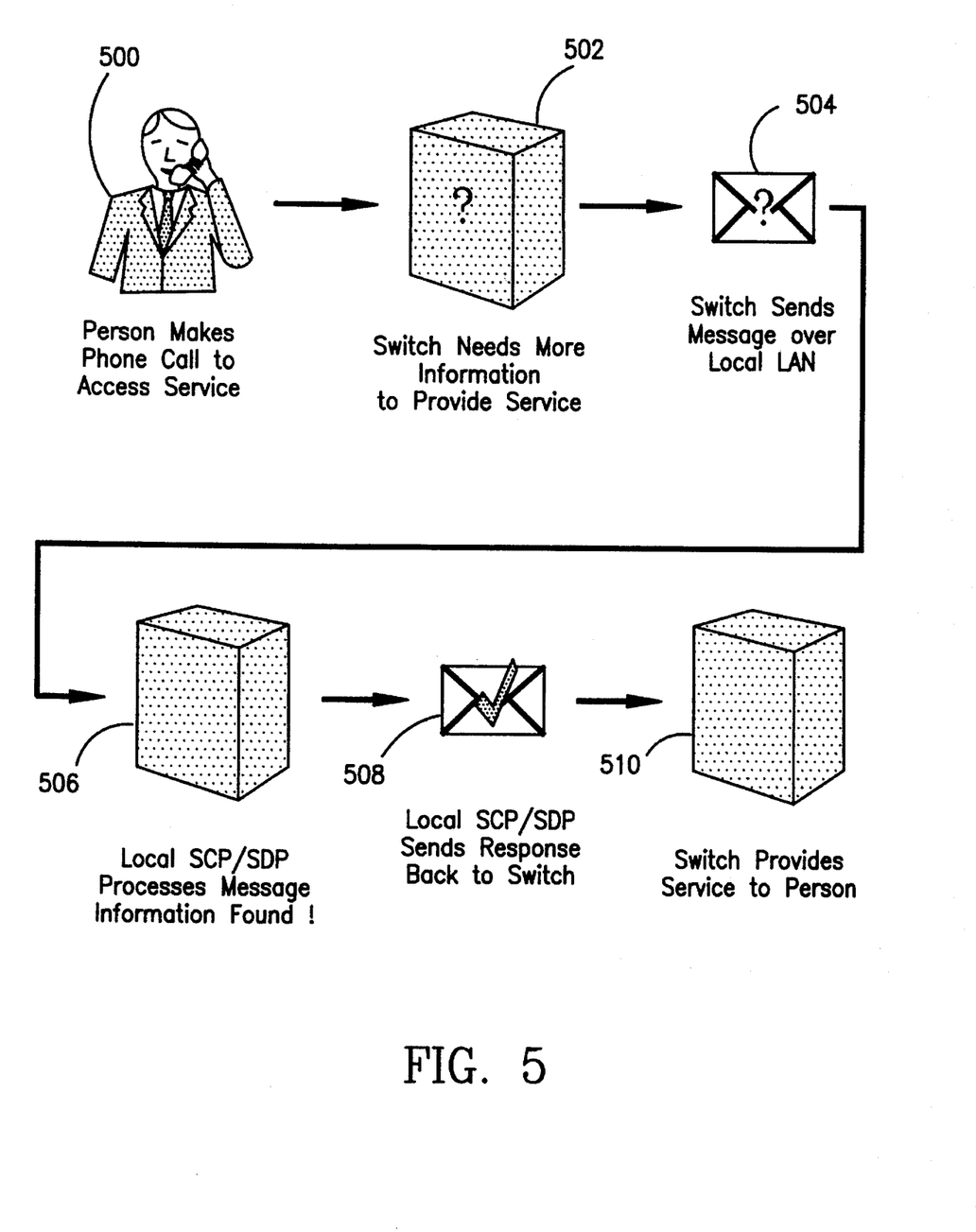
FIG. 5 shows a transaction processing flow chart for a high volume service in accordance with one embodiment of the disclosed invention.

FIG. 5 shows a transaction processing flow chart for a high volume service in accordance with one embodiment of the disclosed invention. In step 500, a person makes a telephone call requiring access to a particular high volume service. In step 502 the switch 102' determines that it cannot process the call, and therefore sends a message over the local LAN 103' requesting additional information in step 504. The local SCP/SDP 100' receives and processes the request message finding the requested information, as shown in step 506. A response message which includes the requested information is then sent to the switch 102' in step 508, which provides the requested service to the caller, as shown in step 510.

Figure 6:
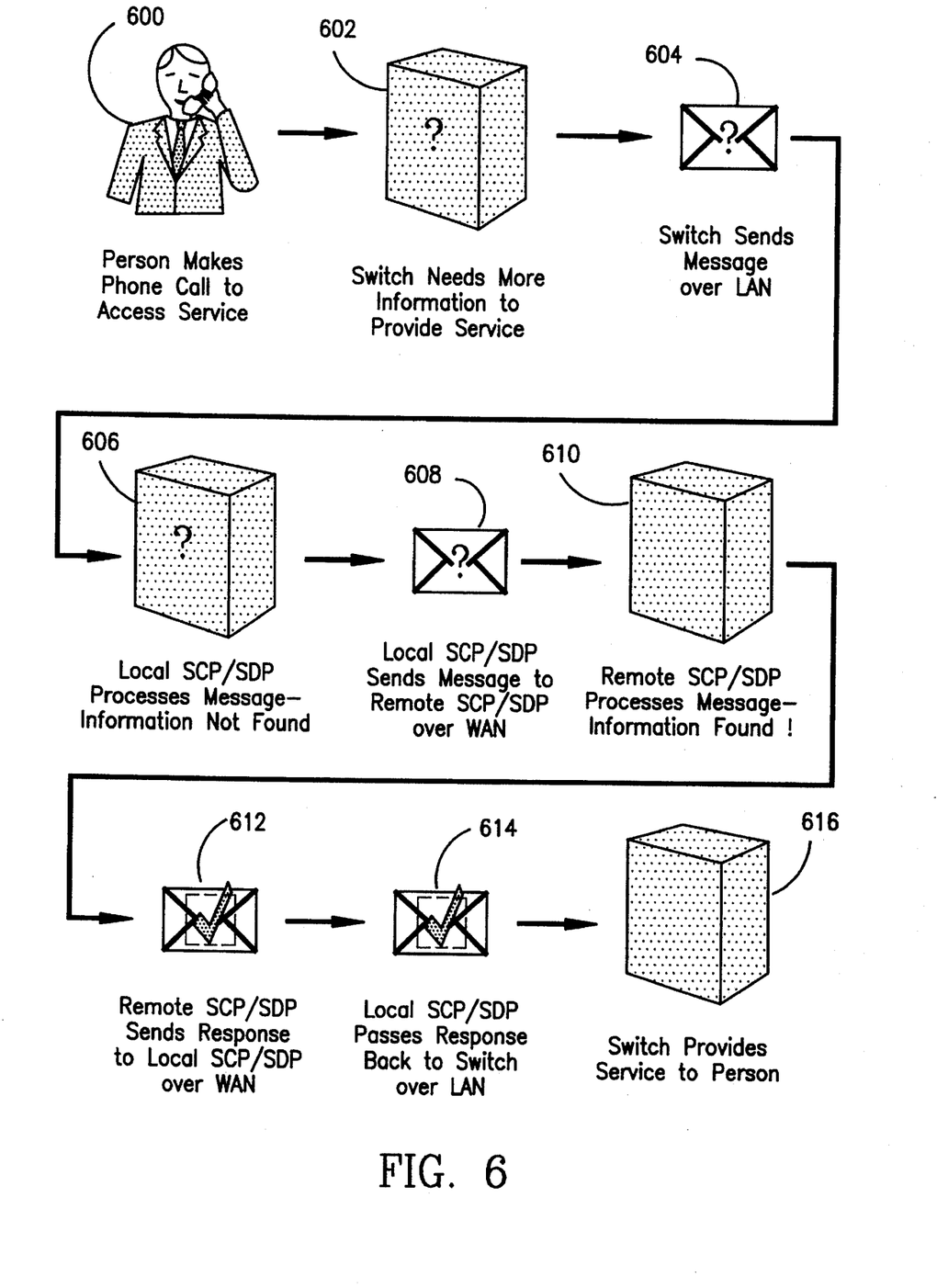
FIG. 6 shows a transaction processing flow chart for a low volume service in accordance with one embodiment of the disclosed invention.

Similar to FIG. 5, FIG. 6 shows a transaction processing flow chart for a low volume service in accordance with one embodiment of the disclosed invention. In step 600, a person makes a telephone call requiring access to a low volume service. In step 602 the switch 102' determines that it cannot process the call, and therefore sends a message over the local LAN 103' requesting additional information in step 604. The local SCP/SDP 100' receives and processes the request message but cannot find the requested information, as shown in step 606. The request message is forwarded via the WAN 107' to the remote SCP/SDP 100" in step 608, which processes the message finding the requested information in step 610. In step 612 the remote SCP/SDP 100" returns a response message with the requested information to the local SCP/SDP 100', which then passes the information to the switch 102' in step 614. Finally, the switch 102' provides the requested service to the caller, as shown in step 616.

Figure 7:
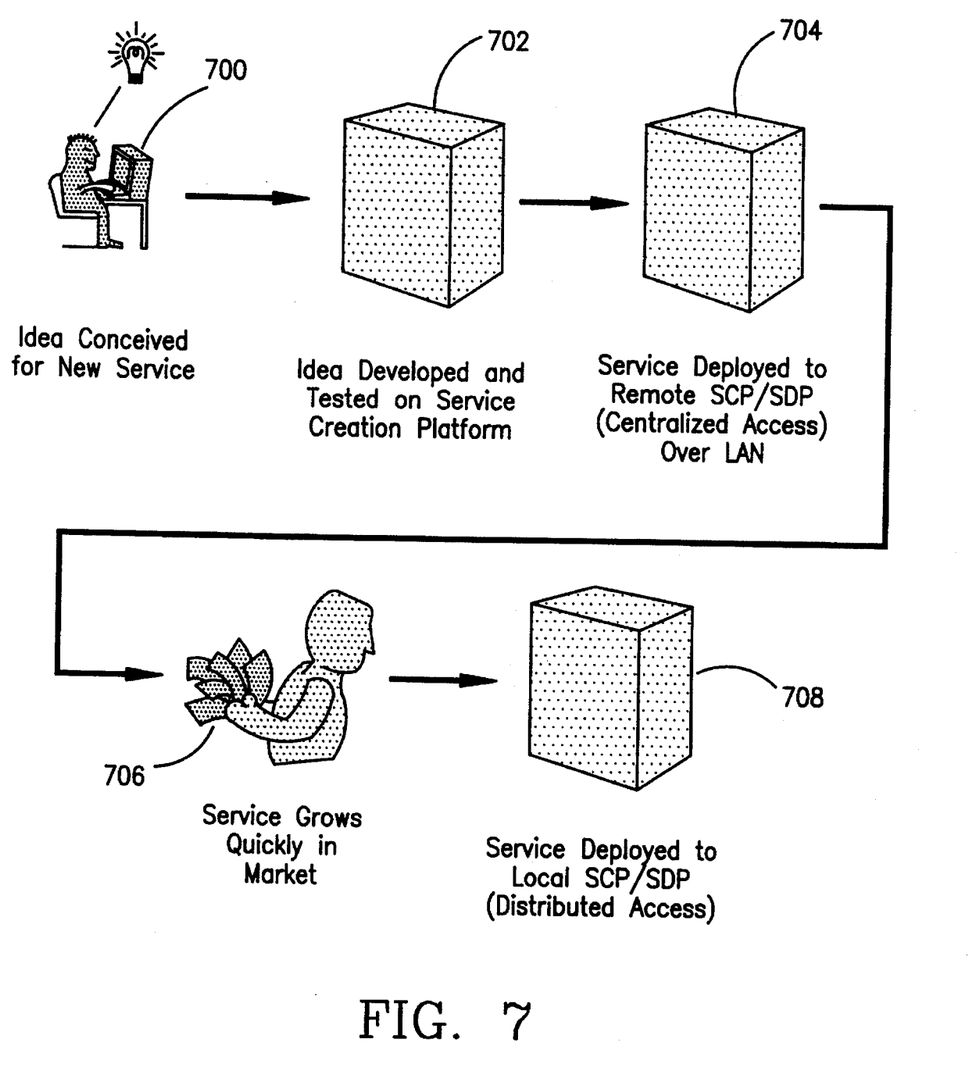
FIG. 7 shows a service creation flowchart in accordance with one embodiment of the disclosed invention.

An additional feature of the disclosed system is the increased functional portability. With the single common interface, a functional element or application can be more easily moved or placed where it best serves the network need. FIG. 7 shows, for example, an idea conceived for a new service in step 700. The service was created and tested on the Service Creation Environment Platform (SCEP) 126, as shown in step 702. The service is expected to have minimal penetration in its initial deployment. It is, therefore, initially downloaded to the remote SCP/SDP 100" in step 704. After initial deployment, the service begins to penetrate the traffic quite significantly, as shown in step 706. Using the disclosed high speed interface, the product would then be easily transferred to the local SCP/SDP 100' that resides either regionally or locally with respect to the switch 102' where the service is accessed (step 708). Using the interface, the traffic and commuting requirements are quickly and efficiently distributed on the network, reducing potential bottlenecks.

Since those skilled in the art can modify the disclosed specific embodiment without departing from the spirit of the invention, it is, therefore, intended that the claims be interpreted to cover such modifications and equivalents.

What is claimed is:

1. A telecommunications system of a common carrier including a plurality of intelligent platforms for processing call related information, said system comprising:

a first local area network for connecting at least two intelligent platforms forming a first group in said plurality of intelligent platforms to transfer call related information therebetween;

a second local area network for connecting at least two other intelligent platforms forming a second group in said plurality of intelligent platforms to transfer call related information therebetween;

a switch for routing a telephone call from a calling station to a called station, said routing being selectively based on call related information held in said first group; and a wide area network, responsive to said first local area network, to said second local area network, and to said switch, for providing a high speed interface to transfer call related information among said first group, said second group and said switch, wherein said first group of intelligent platforms includes call related information with a high transport priority if a data conflict occurs on said wide area network, and said second group of intelligent platforms includes call related information with a low transport priority if said data conflict occurs on said wide area network.

2. The system according to claim 1, wherein said first local area network comprises a fiber distributed data interface in said first group of intelligent platforms.

3. The system according to claim 1, wherein said second local area network comprises a fiber distributed data interface in said second group of intelligent platforms.

4. The system according to claim 1, wherein said high speed interface comprises an asynchronous transfer mode of communication between intelligent platforms of said first and second local area networks.

5. The system according to claim 1, wherein a throughput for non-billing transactions of call related information is at least 2,000 transactions per second.

6. The system according to claim 1, wherein each transaction of call related information comprises a 256 byte message, each byte comprising 8 bits.

7. A telecommunications system of a common carrier including a plurality of intelligent platforms for processing call related information, said system comprising:

a first local area network for connecting at least two intelligent platforms forming a first group in said plurality of intelligent platforms to transfer call related information therebetween, wherein one of said at least two intelligent platforms includes a switch for routing a telephone call from a calling station to a called station;

a second local area network for connecting at least two other intelligent platforms forming a second group in said plurality of intelligent platforms to transfer call related information therebetween; and a wide area network, responsive to said first and second local area networks, for providing a high speed interface to transfer call related information between said first and second groups, wherein said first group includes call related information with a high transport priority such that if said switch requires additional information to provide a critical service, said additional information is obtained from an intelligent platform located on said first local network, and wherein said second group includes call related information with a low transport priority such that if said switch requires further information to provide a non-critical service, said further information is obtained, via said high speed interface, from an intelligent platform located on said second local network.

8. The system according to claim 7, wherein one of said at least two intelligent platforms on said first local area network includes a database.

9. The system according to claim 7, wherein said second group includes a database and a service resource platform.

10. The system according to claim 7, wherein said first local area network comprises a fiber distributed data interface in said first group of intelligent platforms.

11. The system according to claim 7, wherein said second local area network comprises a fiber distributed data interface in said second group of intelligent platforms.

12. The system according to claim 7, wherein said high speed interface comprises an asynchronous transfer mode of communication between intelligent platforms of said first and second local area networks.

13. The system according to claim 7, further comprising an additional intelligent platform connected to said first group and not connected to said first local area network, wherein said additional intelligent platform communicates with said second group of intelligent platforms via said first group and high speed interface.

14. A telecommunications system of a common carrier including a plurality of intelligent platforms for processing call related information, said system comprising:

a first local area network for connecting at least two intelligent platforms forming a first group in said plurality of intelligent platforms to transfer call related information therebetween, wherein one of said at least two intelligent platforms includes a switch for routing a telephone call from a calling station to a called station;

a second local area network for connecting at least two other intelligent platforms forming a second group in said plurality of intelligent platforms to transfer call related information therebetween; and a wide area network, responsive to said first and second local area networks, for providing a high speed interface to transfer call related information between said first and second groups, wherein a new telecommunications service is initially developed and tested on an intelligent platform in said second group, and after development and testing said service is transferred, via said high speed interface, to another intelligent platform in said first group to be locally located with said switch, thereby quickly and efficiently achieving functional portability in said system.

15. The system according to claim 14, wherein said first local area network comprises a fiber distributed data interface in said first group of intelligent platforms.

16. The system according to claim 14, wherein said second local area network comprises a fiber distributed data interface in said second group of intelligent platforms.

17. The system according to claim 14, wherein said high speed interface comprises an asynchronous transfer mode of communication between intelligent platforms of said first and second local area networks.

* * * * *